US011869418B1

(12) United States Patent
Yang et al.

(10) Patent No.: US 11,869,418 B1
(45) Date of Patent: Jan. 9, 2024

(54) MICRO LIGHT EMITTING DIODE DISPLAY PANEL

(71) Applicant: PlayNitride Display Co., Ltd., MiaoLi County (TW)

(72) Inventors: Shiang-Ning Yang, MiaoLi County (TW); Yung-Chi Chu, MiaoLi County (TW); Chang-Rong Lin, MiaoLi County (TW); Yu-Ya Peng, MiaoLi County (TW)

(73) Assignee: PlayNitride Display Co., Ltd., Miaoli County (TW)

( * ) Notice: Subject to any disclaimer, the term of this patent is extended or adjusted under 35 U.S.C. 154(b) by 0 days.

(21) Appl. No.: 17/976,861

(22) Filed: Oct. 30, 2022

(30) Foreign Application Priority Data

Sep. 6, 2022 (TW) .................................. 111133658

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2320/0233* (2013.01); *G09G 2320/0626* (2013.01)

(58) Field of Classification Search
CPC ................... G09G 3/2007; G09G 3/32; G09G 2320/0233; G09G 2320/0626
See application file for complete search history.

(56) References Cited

U.S. PATENT DOCUMENTS 10,327,293 B2 * 6/2019 Lo .......................... H05B 31/50
10,535,295 B2 * 1/2020 Hughes ................ G09G 3/2088
10,957,241 B2 * 3/2021 Hughes ................ G09G 3/2088
11,328,659 B2 * 5/2022 Ikeda ................... G09G 3/2081
11,386,831 B2 * 7/2022 Hughes ............... H01L 25/0753
2017/0316736 A1 * 11/2017 Hughes ............... H01L 25/0753
2021/0280741 A1 * 9/2021 Lo ....................... H01L 25/0753
2021/0358392 A1 * 11/2021 Ikeda .................. G09G 3/2081

FOREIGN PATENT DOCUMENTS

CN 113539170 10/2021
TW 201915997 4/2019

OTHER PUBLICATIONS

"Office Action of Taiwan Counterpart Application", dated Aug. 9, 2023, p. 1-p. 7.

* cited by examiner

*Primary Examiner* — Gene W Lee
(74) *Attorney, Agent, or Firm* — JCIPRNET

(57) ABSTRACT

A micro light emitting diode display panel including multiple pixel structures is provided. Each of the pixel structures includes at least one sub-pixel, which includes a first micro-light-emitting chip with a first light-emitting area and a second micro-light-emitting chip with a second light-emitting area smaller than the first light-emitting area. The first micro-light-emitting chip emits light corresponding to a first luminance interval according to a first operating current interval. The second micro light-emitting chip emits light corresponding to a second luminance interval according to a second operating current interval. A gray-scale value of the second luminance interval is lower than a gray-scale value of the first luminance interval. The first micro-light-emitting chip and the second micro light-emitting chip have the same light-emitting color. The second micro-light-emitting chip has a smaller slope of a tangent line to a luminance versus current curve than the first micro-light-emitting chip.

11 Claims, 7 Drawing Sheets

MICRO LIGHT EMITTING DIODE DISPLAY PANEL

CROSS-REFERENCE TO RELATED APPLICATION

This application claims the priority benefit of Taiwan application serial no. 111133658, filed on Sep. 6, 2022. The entirety of the above-mentioned patent application is hereby incorporated by reference herein and made a part of this specification.

BACKGROUND

Technical Field

The disclosure relates to a display panel, and in particular to a micro light emitting diode display panel.

Description of Related Art

With the evolution of optoelectronic technology, solid-state light sources (such as light-emitting diodes) have been widely used in various fields, such as road lighting, large outdoor signage, traffic lights, etc. Recently, a micro light emitting diode display panel has been developed, which is provided with micro light emitting diodes as sub-pixels in the display panel, so that each sub-pixel can be independently driven to emit light. A display panel that combines the light beams from these actively emitting micro light emitting diodes into an image is a micro light emitting diode display panel. Compared with non-active light emitting display panels, micro light emitting diode display panels that can actively emit light have higher luminance, contrast, and color saturation, and are therefore highly anticipated for display applications.

In addition, compared with organic light emitting diodes (OLEDs), micro light emitting diodes offer higher lifetime, reliability, and lower stabilizable light-emitting current. Therefore, micro light emitting diodes can solve the visual flicker problem caused by PWM low-frequency dimming in response to high-current light emission of OLEDs.

However, due to some technical issues associated with the micro light emitting diode in size reduction, for example, many factors in the manufacturing process cause the micro light emitting diode to have different degrees of structural defects, which still makes the light-emitting efficiency of each chip inconsistent. The problem of inconsistent luminous performance at normal display luminance can be solved by adjusting the operating current of these chips. However, when the luminance demand is extremely low and the micro light emitting diode is set to operate at very low current, unstable luminescence may still occur, which is a problem of uneven overall luminance in terms of the visual experience of the display panel. Therefore, it is one of the research focuses of this field to make the micro light emitting diode display panel with high luminance uniformity under very low current.

SUMMARY

The disclosure provides a micro light emitting diode display panel capable of improving luminescence uniformity at low display luminance.

The micro light emitting diode display panel of the disclosure includes multiple pixel structures. Each of the pixel structures includes at least one sub-pixel. The at least one sub-pixel is configured to emit light in multiple luminance intervals. Each of the at least one sub-pixel includes a first micro-light-emitting chip and a second micro-light-emitting chip. The first micro-light-emitting chip has a first light-emitting area, and emits light corresponding to a first luminance interval according to a first operating current interval. The second micro-light-emitting chip has a second light-emitting area smaller than the first light-emitting area, and emits light corresponding to a second luminance interval according to a second operating current interval. A gray-scale value of the second luminance interval is lower than a gray-scale value of the first luminance interval. The first micro-light-emitting chip and the second micro-light-emitting chip have the same light-emitting color, and when emitting light, the second micro-light-emitting chip has a smaller slope of a tangent line to a luminance versus current curve than the first micro-light-emitting chip.

Based on the above, the sub-pixels of the micro light emitting diode display panel include the first micro-light-emitting chip and the second micro-light-emitting chip, and the first light-emitting area of the first micro-light-emitting chip is larger than the second light-emitting area of the second micro-light-emitting chip. In this way, based on the set gray-scale value or luminance value, the sub-pixels of the micro light emitting diode display panel may improve the luminescence uniformity of the micro light emitting diode display panel by providing light in different luminance intervals with the first micro-light-emitting chip and the second micro-light-emitting chip.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
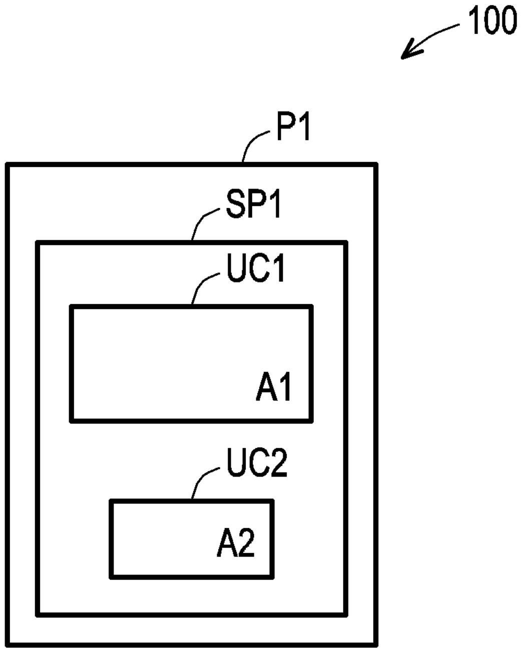
FIG. 1 is a schematic diagram of a micro light emitting diode display panel according to an embodiment of the disclosure.

Some embodiments of the disclosure will be described in detail together with the accompanying drawings. The reference numerals in the following description will be regarded as the same or similar elements when the same reference numerals appear in different drawings. These embodiments are only a part of the disclosure and do not disclose all the ways in which the disclosure may be implemented. More precisely, these embodiments are only examples of the claims of the disclosure.

In the drawings, each drawing illustrates the general characteristics of methods, structures, or materials used in particular embodiments. However, these drawings should not be construed as defining or limiting the scope or nature covered by these embodiments. For example, the relative size, thickness, and location of each film layer, region, or structure may be reduced or enlarged for the sake of clarity.

Terms such as “first” and “second” mentioned in this specification or the claims are used only to name different elements or to distinguish different embodiments or ranges, and are not used to limit the upper or lower limits on the number of elements, nor to limit the order of manufacture or the order of placement of elements.

Figure 2:
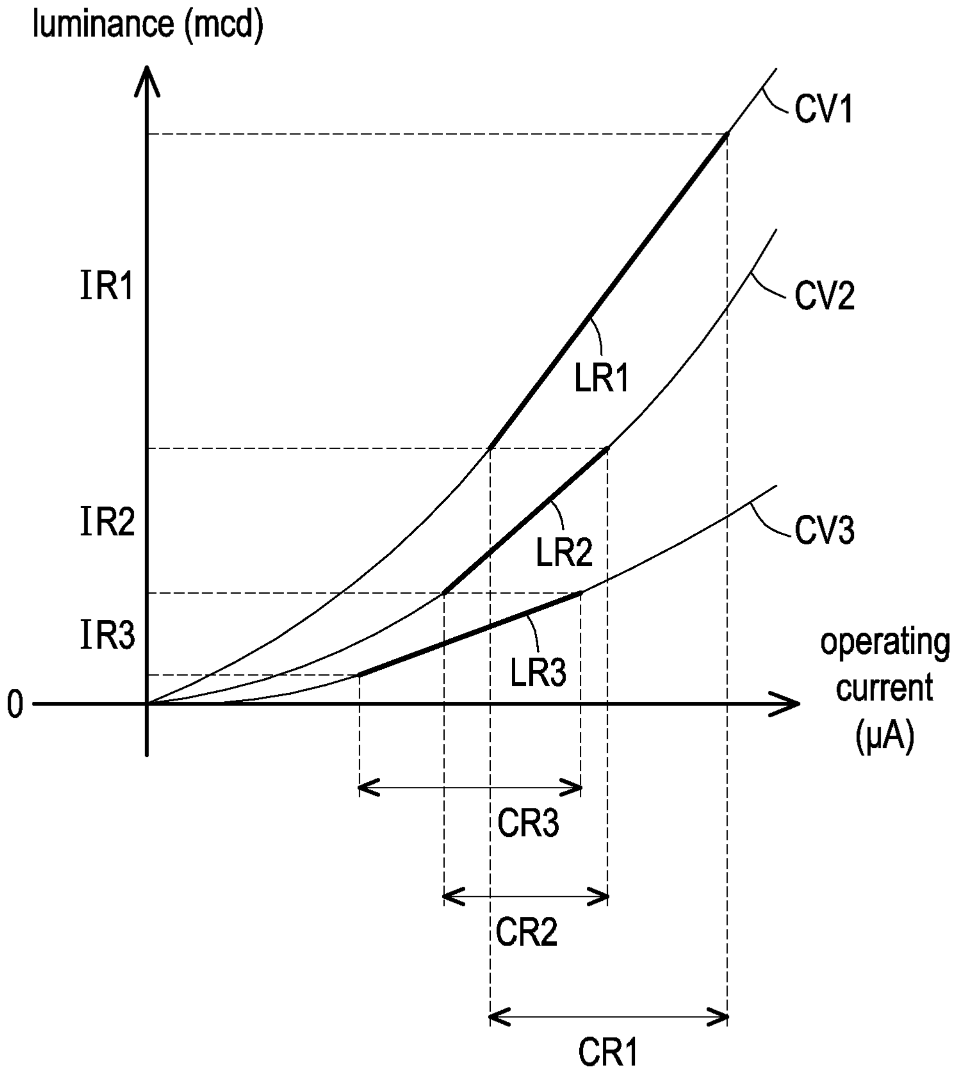
FIG. 2 is a schematic diagram illustrating a relationship between an operating current, luminance, and linear intervals according to an embodiment of the disclosure.

Referring to FIG. 1 and FIG. 2. FIG. 1 is a schematic diagram of a micro light emitting diode display panel according to an embodiment of the disclosure. FIG. 2 is a schematic diagram illustrating a relationship between an operating current, luminance, and linear intervals according to an embodiment of the disclosure. According to this embodiment, a micro light emitting diode display panel 100 at least includes a pixel structure P1. The pixel structure P1 includes at least a sub-pixel SP1. The pixel structure P1 is operated to emit light in multiple luminance intervals.

According to this embodiment, the sub-pixel SP1 includes a first micro-light-emitting chip UC1 and a second micro-light-emitting chip UC2. The first micro-light-emitting chip UC1 and the second micro-light-emitting chip UC2 are micro light emitting diode (Micro LED) chips respectively. The first micro-light-emitting chip UC1 has a light-emitting area A1. The first micro-light-emitting chip UC1 may emit light corresponding to a first luminance interval IR1 according to a first operating current interval CR1 in FIG. 2. The second micro-light-emitting chip UC2 has a light-emitting area A2 smaller than the light-emitting area A1. The second micro-light-emitting chip UC2 may emit light corresponding to a second luminance interval IR2 according to a second operating current interval CR2. The first micro-light-emitting chip UC1 and the second micro-light-emitting chip UC2 have the same light-emitting color.

As shown in FIG. 2, according to this embodiment, the first luminance interval IR1 is different from the second luminance interval IR2, that is, the two luminance intervals do not overlap each other. In addition, a gray-scale value of the second luminance interval IR2 is lower than a gray-scale value of the first luminance interval IR1.

Specifically, the sub-pixel SP1 is controlled to emit light in the first luminance interval IR1 or the second luminance interval IR2 by a pixel driving circuit (such as but not limited to a transistor) or an integrated circuit control chip of the micro light emitting diode display panel 100 with the first micro-light-emitting chip UC1 or the second micro-light-emitting chip UC2. The first micro-light-emitting chip UC1 and the second micro-light-emitting chip UC2 are controlled to operate in the first operating current interval CR1 and the second operating current interval CR2, respectively, according to the actual luminance required in the respective corresponding luminance intervals.

For the purpose of illustration, a number of the pixel structures and the sub-pixels according to this embodiment is one, for example. However, the number of the pixel structures of the disclosure may be one or more and is not limited to this embodiment.

For example, 3 curves CV1, CV2, CV3 are shown in FIG. 2. The curves CV1 and CV2 respectively represent trends of variation of the operating current and luminance of the first micro-light-emitting chip UC1 and the second micro-light-emitting chip UC2. However, this embodiment may include more micro-light-emitting chips, for example, the curve CV3 may represent a micro-light-emitting chip with a smaller light-emitting area than the light-emitting area A2.

In the curve CV1, when the first micro-light-emitting chip UC1 is operated within the first operating current interval CR1, its operating current and luminance show a linearly proportional relationship, i.e., a linear interval LR1. Similarly, in the curve CV2, when the second micro-light-emitting chip UC2 is operated within the second operating current interval CR2, the luminance interval IR2 corresponds to a linear interval LR2.

Based on the gray-scale value (luminance) to be displayed, the sub-pixel SP1 of the micro light emitting diode display panel 100 may provide light in different luminance intervals with the first micro-light-emitting chip UC1 and the second micro-light-emitting chip UC2. For the second micro-light-emitting chip UC2, the current in the luminance interval IR2 is controlled in the operating current interval CR2, which is the linear interval LR2; conversely, if the first micro-light-emitting chip UC1 emits light in the luminance interval IR2, its operating current will be lower than its linear interval LR1. This means that the trend of variation of the luminance of the second micro-light-emitting chip UC2 in the operating current interval CR2 with the operating current is more linearly controllable than the first micro-light-emitting chip UC1 in the same luminance interval IR2 (in the luminance interval IR2, the first micro-light-emitting chip UC1 is no longer in the appropriate operating current interval CR1). Therefore, the second micro-light-emitting chip UC2 is selected for linear luminance control when low gray-scale values are required.

Figure 6:
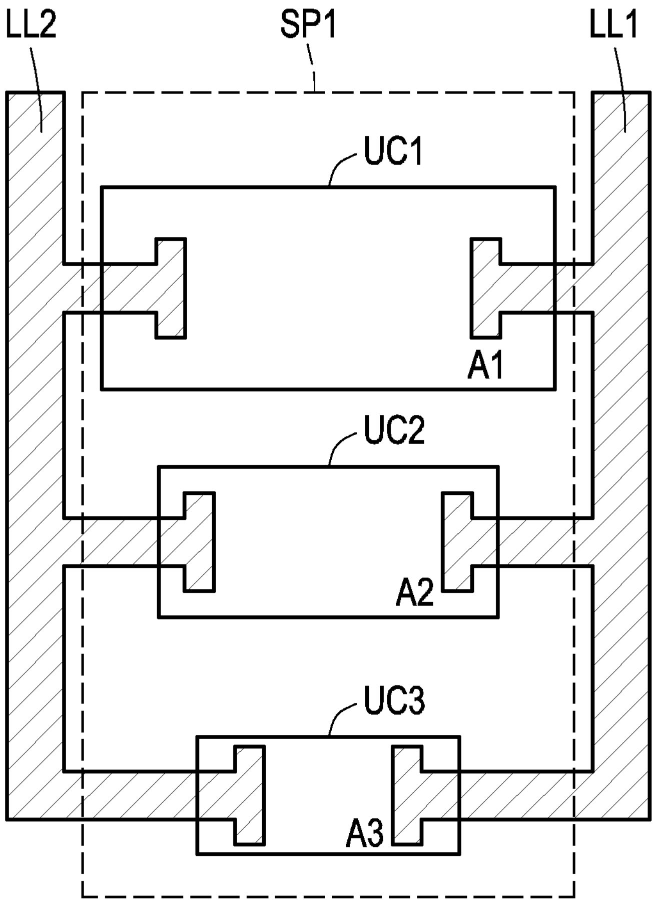
FIG. 6 is a schematic diagram of a sub-pixel according to an embodiment of the disclosure.

Referring to FIG. 6, the curve CV3 is further used as an example. In some embodiments, the sub-pixel SP1 may include a third micro-light-emitting chip UC3, and it is assumed here that a trend of variation of an operating current and luminance of the third micro-light-emitting chip UC3 corresponds to the curve CV3 in FIG. 2. For the third micro-light-emitting chip UC3, the operating current corresponds to a luminance interval IR3 in an operating current interval CR3, and the curve CV3 corresponds to a linear interval LR3 in the luminance interval IR3. That is, within a range of the operating current interval CR3, the trend of variation of the operating current and luminance of the third micro-light-emitting chip UC3 show a linearly proportional relationship. Therefore, since the third micro-light-emitting chip UC3 may be operated in the linear interval LR3 according to the demand of the luminance interval IR3, the sub-pixel SP1 may satisfy the purpose of relatively linear control in the luminance interval IR3.

In FIG. 2, the corresponding luminance intervals of the curves CV1, CV2, and CV3 do not overlap with each other. However, since the actual corresponding linear intervals (e.g., LR1 and LR2) of each chip may overlap, in some embodiments, the first luminance interval IR1, the second luminance interval IR2 and the third luminance interval IR3 may partially overlap with each other. Therefore, for different luminescence requirements, the first micro-light-emitting chip UC1, the second micro-light-emitting chip UC2, and the third micro-light-emitting chip UC3 may also emit light at the same time in a certain luminance interval. In short, the disclosure does not limit the operating current interval of each micro-light-emitting chip to correspond to only one luminance interval.

According to this embodiment, the light-emitting area A2 of the second micro-light-emitting chip UC2 is designed to be less than or equal to 70% of the light-emitting area A1 of the first micro-light-emitting chip UC1, so that the first luminance interval IR1 is separated to a greater extent from the second luminance interval IR2. However, the area ratio may be adapted to the actual situation and is not a necessary condition for the implementation of the disclosure.

Figure 3:
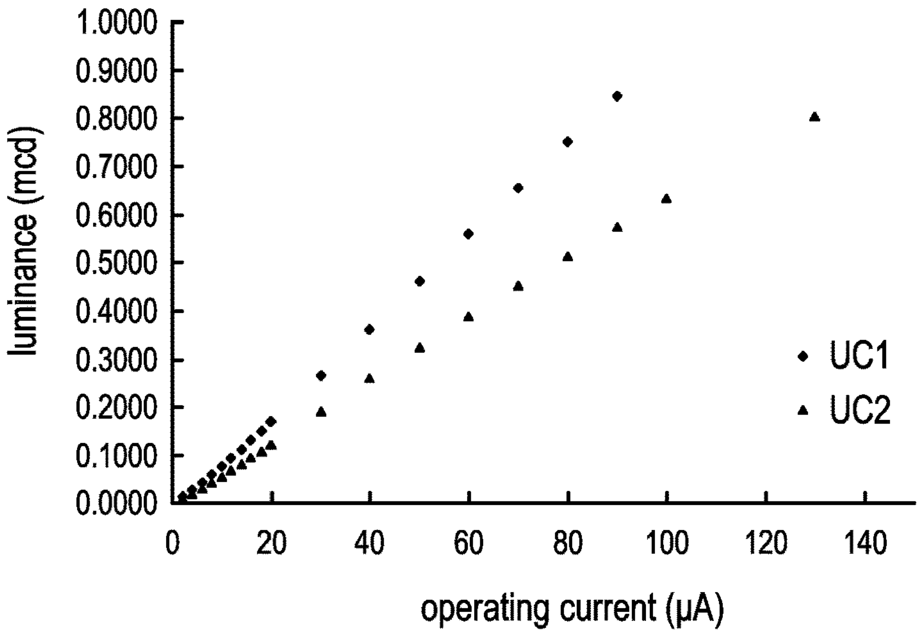
FIG. 3 is a schematic diagram illustrating a relationship between an operating current and luminance according to an embodiment of the disclosure.

Referring to FIG. 1 and FIG. 3 at the same time, FIG. 3 is a schematic diagram illustrating a relationship between an operating current and luminance according to an embodiment of the disclosure. According to this embodiment, FIG. 3 shows a relationship between the operating current and luminance of the first micro-light-emitting chip UC1 of the sub-pixel SP1 (e.g., diamond marks) and a relationship between the operating current and luminance of the second micro-light-emitting chip UC2 of the sub-pixel SP1 (e.g., triangle marks).

Figure 4:
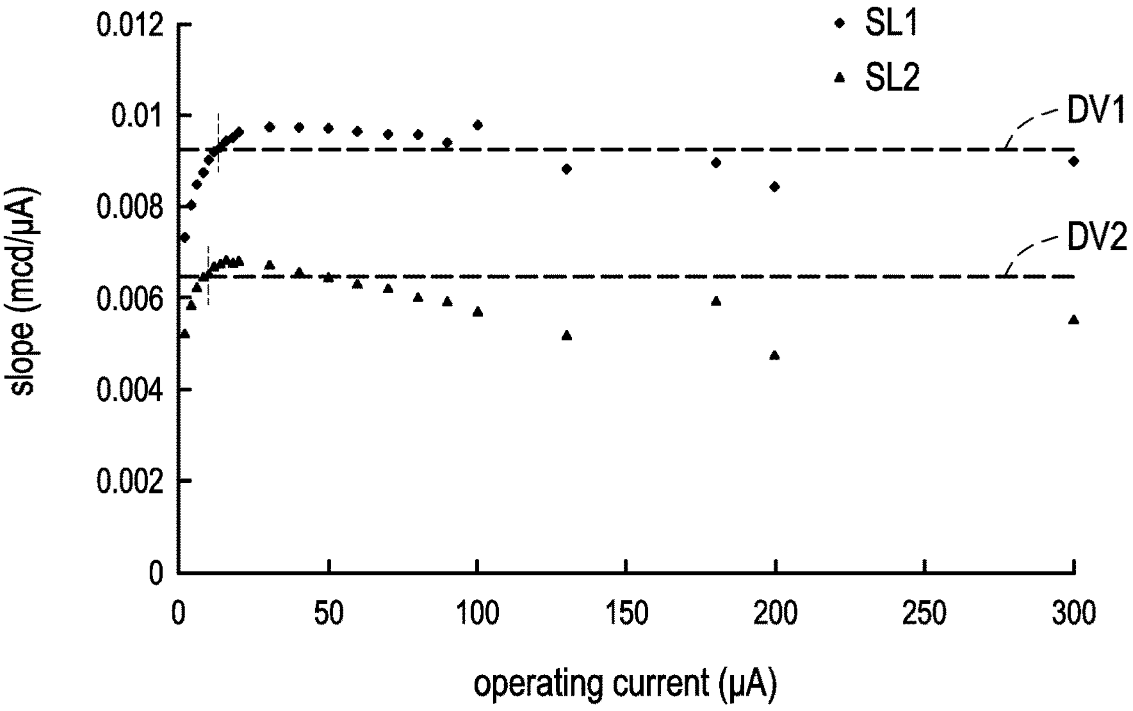
FIG. 4 is a schematic diagram illustrating a relationship between the operating current according to FIG. 3 and a slope of a tangent line to a luminance versus current curve.

Referring to FIG. 1, FIG. 3, and FIG. 4 at the same time, FIG. 4 is a schematic diagram illustrating a relationship between the operating current according to FIG. 3 and a slope of a tangent line to a luminance versus current curve. FIG. 4 shows a relationship between the operating current of the first micro-light-emitting chip UC1 of the sub-pixel SP1 and a slope of a tangent line to luminance versus current curve SL1 (e.g., diamond marks), and a relationship between the operating current of the second micro-light-emitting chip UC2 and a slope of a tangent line to luminance versus current curve SL2 (e.g., triangular marks). Values of the slopes of the tangent line of luminance versus current curve SL1 and SL2 shown in FIG. 4 are generated from multiple slopes of luminance versus operating current shown in FIG. 3. In detail, the value of the slope under the operating current is obtained by taking two adjacent numerical points in FIG. 3 and dividing a difference value in luminance between the two numerical points by a difference value in the operating current. The relationship diagram in FIG. 4 may be obtained by repeating the above calculation for all two adjacent numerical points in FIG. 3, so that FIG. 4 may be considered as a differentiation result of FIG. 3. Since the first micro-light-emitting chip UC1 has a larger light-emitting area A1, the first micro-light-emitting chip UC1 has a higher luminance at the same operating current, and its slope of the tangent line to luminance versus current curve SL1 is also larger than the slope of the tangent line to luminance versus current curve SL2 of the second micro-light-emitting chip UC2.

It should be noted that, as shown in FIG. 4, the closer the slopes of the tangent line to luminance versus current curve SL1 and SL2 are to the peak, the smaller the variation in the slopes of the tangent line to luminance versus current curve SL1 and SL2 may be observed. Here, for the peak region with less variation, the slope of the tangent line to luminance versus current curve SL1 greater than a reference value DV1 and the slope of the tangent line to luminance versus current curve SL2 greater than a reference value DV2 are sorted out, where the reference value DV1 is greater than the reference value DV2. The significance of the reference value DV1 and the reference value DV2 is that the sensitivity of the luminance of the first micro-light-emitting chip UC1 and the second micro-light-emitting chip UC2 to the operating current is sufficient in the case where the slopes of the tangent line to luminance versus current curve SL1 and SL2 is close to the peak (above the reference value), and there is a linearly proportional relationship with other operating current intervals (i.e., the luminance increases steadily with the increase in current). As shown in FIG. 4, a value of the slope of the tangent line to luminance versus current curve SL2 of the second micro-light-emitting chip UC2 reaches its reference value DV2 or more at a lower operating current. In other words, compared with the first micro-light-emitting chip UC1, the second micro-light-emitting chip UC2 has a lower steady operating current.

In combination with FIG. 2, it can be reasonably deduced that the second micro-light-emitting chip UC2 has a higher operating current density due to its smaller area, so the second micro-light-emitting chip UC2 may reach its peak region earlier under the same operating current.

In addition, it should be noted that lower limits of the operating current intervals CR1, CR2, and CR3 corresponding to the linear intervals LR1, LR2, and LR3 decrease sequentially as the light-emitting area of the micro-light-emitting chip shrinks. This trend is consistent with the pattern shown in FIG. 4 above. With this feature, if the sub-pixel SP1 needs to emit light in a gray-scale value corresponding to the luminance interval IR2, the second micro-light-emitting chip UC2 may replace the first micro-light-emitting chip UC1, and the second micro-light-emitting chip UC2 is controlled to emit light in the operating current interval CR2, i.e., the linear interval LR2.

Figure 5:
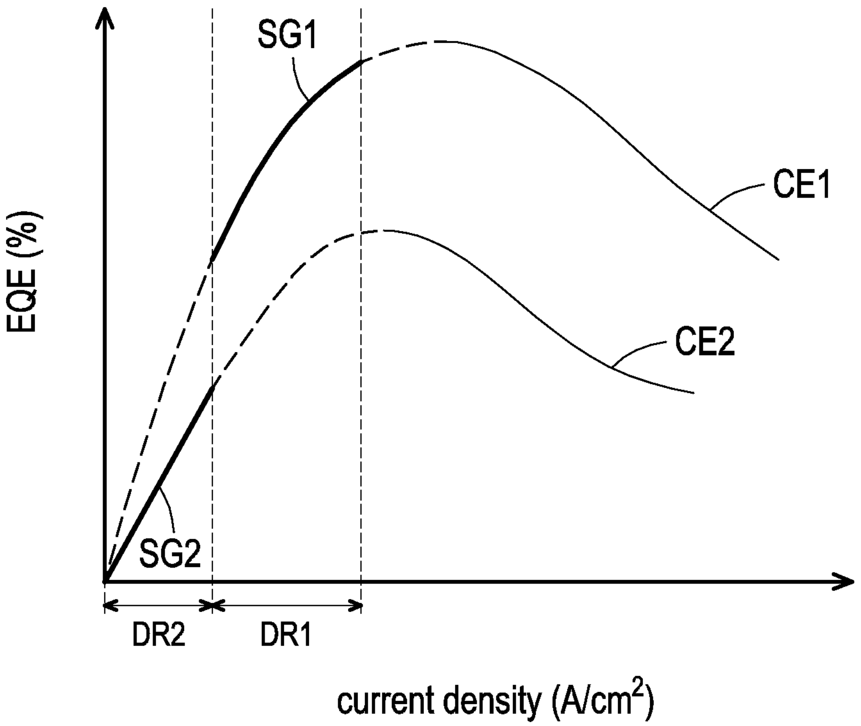
FIG. 5 is a schematic diagram illustrating a relationship between current density and external quantum efficiency according to an embodiment of the disclosure.

Referring to FIG. 1, FIG. 2, and FIG. 5 at the same time, FIG. 5 is a schematic diagram illustrating a relationship between current density and external quantum efficiency (EQE) according to an embodiment of the disclosure. FIG. 5 shows an EQE curve CE1 of the first micro-light-emitting chip UC1 and an EQE curve CE2 of the second micro-light-emitting chip UC2 of the sub-pixel SP1. The EQE curves CE1 and CE2 show the relationship between the external quantum efficiency (EQE) of the first micro-light-emitting chip UC1 and the second micro-light-emitting chip UC2 in relation to the operating current density when emitting light, respectively. Due to the influence of process and other factors, the EQE of micro-light-emitting chips with the same material and process will have different curves depending on the size. For example, a side-wall effect causes the EQE of small-sized chips with a higher proportion of side-wall surface area to decrease. As a result, the second micro-light-emitting chip UC2, which has a smaller light-emitting area A2, has a smaller increase in current density than the first micro-light-emitting chip UC1. This is also the reason why the second micro-light-emitting chip UC2 is suitable for emitting light in the lower luminance interval.

According to some embodiments, the first micro-light-emitting chip UC1 may be operated in a range of a current density DR1, the second micro-light-emitting chip UC2 may be operated in a range of a current density DR2, and the current density DR1 is greater than the current density DR2. According to one embodiment, the interval between the current densities DR1 and DR2 may be divided by 2.5 $A/cm^2$ ($amps/cm^2$), but not limited thereto. In detail, in the current density interval DR2, the EQE of the first micro-light-emitting chip UC1 and the second micro-light-emitting chip UC2 vary in magnitude, i.e., the EQE of the second micro-light-emitting chip UC2 increases more slowly with the increase of the current density. When the second micro-light-emitting chip UC2 is operated in the current density interval DR2, the EQE curve CE2 corresponds to a smoother trend of an segment SG2 than the first micro-light-emitting chip UC1 in the current density interval DR2 (as shown in the dashed line), making it easier for the second micro-light-emitting chip UC2 to adjust the luminance for low gray-scale values. On the other hand, in the interval of high gray-scale value, the first micro-light-emitting chip UC1 may be operated at the current density DR1, and its EQE curve CE1 corresponds to a segment SG1. In other words, the operating current density of the second micro-light-emitting chip UC2 may be smaller than the operating current density of the first micro-light-emitting chip UC1 at a specific gray-scale value setting, even though the second micro-light-emitting chip UC2 has a smaller light-emitting area A2.

As mentioned above, the EQE curve CE2 of the second micro-light-emitting chip UC2 in the current density interval DR2 increases less magnitude with the current density. It can be understood that when the current input to the second micro-light-emitting chip UC2 increases, the actual luminance rate is also slower (i.e., the span of the corresponding gray-scale value is smaller) due to the lower increase in the external quantum efficiency. With this feature, when the luminance requirement is in a low range, the operating current of the second micro-light-emitting chip UC2 is applicable to a relatively wide adjustment range for each scale of the gray-scale value setting, without the need to cut the input current value as intensively as the first micro-light-emitting chip UC1. With the configuration of this embodiment, the sub-pixel SP1 may achieve luminance uniformity at different gray-scale value settings while avoiding the problem that it is difficult to control accurately by adjusting the current at very low luminance.

According to this embodiment, a current value of the first micro-light-emitting chip UC1 in the operating current interval CR1 is greater than or equal to a first current threshold, a current value of the second micro-light-emitting chip UC2 in the operating current interval CR2 is greater than or equal to a second current threshold, and the first current threshold is greater than the second current threshold. That is, the second micro-light-emitting chip UC2 may perform a linear and stable luminance adjustment at the lower operating current interval CR2 compared to the first micro-light-emitting chip UC1.

In the same way as described above, a third micro-light-emitting chip UC3 (as shown in FIG. 6) may be further configured for lower gray-scale values, and a light-emitting area A3 of the third micro-light-emitting chip UC3 is smaller than the light-emitting area A2 of the second micro-light-emitting chip UC2. The difference between the light-emitting area of the micro-light-emitting chip and the external quantum efficiency for different gray-scale value settings has already been explained above, and therefore will not be repeated in the following.

Referring to FIG. 2 and FIG. 6 at the same time, FIG. 6 is a schematic diagram of a sub-pixel according to an embodiment of the disclosure. The difference between the embodiment of FIG. 6 and the embodiment of FIG. 1 is that a sub-pixel SP1 includes a first micro-light-emitting chip UC1, a second micro-light-emitting chip UC2, and a third micro-light-emitting chip UC3. According to this embodiment, the first micro-light-emitting chip UC1 has a light-emitting area A1, the second micro-light-emitting chip UC2 has a light-emitting area A2, and the third micro-light-emitting chip UC3 has a light-emitting area A3.

According to this embodiment, the light-emitting area A3 is different from the light-emitting area A1 and the light-emitting area A2. As shown in FIG. 2, the first micro-light-emitting chip UC1, the second micro-light-emitting chip UC2, and the third micro-light-emitting chip UC3 may emit light in different luminance intervals according to different operating current intervals respectively. In detail, the first micro-light-emitting chip UC1, the second micro-light-emitting chip UC2, and the third micro-light-emitting chip UC3 emit light corresponding to the luminance intervals IR1, IR2 and IR3. According to this embodiment, in the sub-pixel SP1, the operating current of the third micro-light-emitting chip UC3 may be different from the operating current of the luminance intervals IR1 and IR2. Although the luminance intervals IR1, IR2, and IR3 shown in FIG. 2 do not overlap at all, the operating current intervals CR1, CR2, and CR3 may partially overlap as shown in FIG. 2, depending on the actual characteristics of the first micro-light-emitting chip UC1, the second micro-light-emitting chip UC2, and the third micro-light-emitting chip UC3. Therefore, the luminance intervals IR1, IR2, and IR3 may also partially overlap each other. Depending on the application requirements, the first micro-light-emitting chip UC1, the second micro-light-emitting chip UC2, and the third micro-light-emitting chip UC3 are not limited to only correspond to a single luminance interval respectively. For example, the second micro-light-emitting chip UC2 may be designed to emit light with the first micro-light-emitting chip UC1 when the gray-scale value is in the luminance interval IR1, in addition to correspond to the luminance interval IR2.

According to this embodiment, the first micro-light-emitting chip UC1, the second micro-light-emitting chip UC2, and the third micro-light-emitting chip UC3 are connected to electrical connection structures LL1 and LL2. For example, the first micro-light-emitting chip UC1, the second micro-light-emitting chip UC2, and the third micro-light-emitting chip UC3 may receive the operating current through the electrical connection structure LL1, and are connected to a reference power source (e.g. grounded) through the electrical connection structure LL2. The first micro-light-emitting chip UC1, the second micro-light-emitting chip UC2, and the third micro-light-emitting chip UC3 may be arranged according to the actual circuit and package design.

Figure 7:
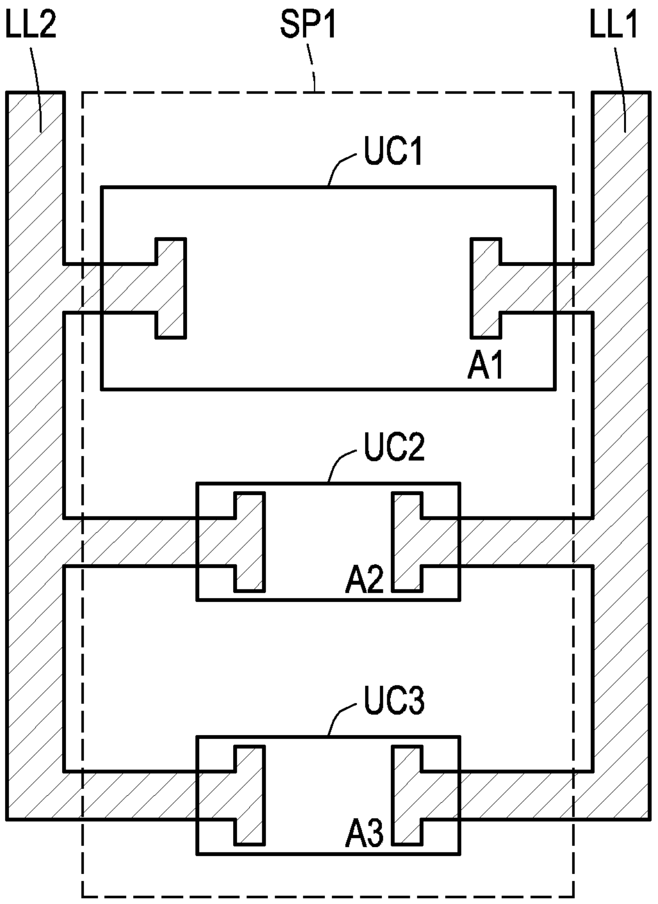
FIG. 7 is a schematic diagram of a sub-pixel according to another embodiment of the disclosure.

Referring to FIG. 2 and FIG. 7 at the same time, FIG. 7 is a schematic diagram of a sub-pixel according to another embodiment of the disclosure. According to this embodiment, the light-emitting area A3 of the third micro-light-emitting chip UC3 is approximately the same as the light-emitting area A2 of the second micro-light-emitting chip UC2. Therefore, the luminance interval of the light emitted by the third micro-light-emitting chip UC3 is approximately the same as the luminance interval of the light emitted by the second micro-light-emitting chip UC2. For example, the first micro-light-emitting chip UC1 emits light corresponding to the luminance interval IR1 according to the operating current interval CR1. The second micro-light-emitting chip UC2 and the third micro-light-emitting chip UC3 emit light corresponding to the luminance interval IR2 according to the operating current interval CR2, or emit light corresponding to the luminance interval IR3 according to the operating current interval CR3.

In addition, although the luminance intervals IR1 and IR2 in FIG. 2 are closely adjacent to each other according to the control settings, the actual luminance corresponding to the linear intervals LR1 and LR2 of the first micro-light-emitting chip UC1 and the second micro-light-emitting chip UC2 may not cover the full range of the gray-scale values as in FIG. 2 due to various design requirements or process limitations of the micro-light-emitting chip. In other words, there may be a gap between the corresponding gray-scale value ranges for the two chips. Therefore, the third micro-light-emitting chip UC3 shown in FIG. 6 and FIG. 7 may be provided to compensate for the gap in the luminance interval in addition to correspond to the luminance interval IR3 of FIG. 2. For example, the third micro-light-emitting chip UC3 may also emit light in the luminance interval IR1 and/or IR2 in addition to correspond to the luminance interval IR3, and have different operating currents respectively.

According to some embodiments not shown, the light-emitting area A3 of the third micro-light-emitting chip UC3 may be designed to be larger than the light-emitting area A2 of the second micro-light-emitting chip UC2. For example, the light-emitting area A3 of the third micro-light-emitting chip UC3 may also be larger than or equal to the light-emitting area A1 of the first micro-light-emitting chip UC1.

Figure 8:
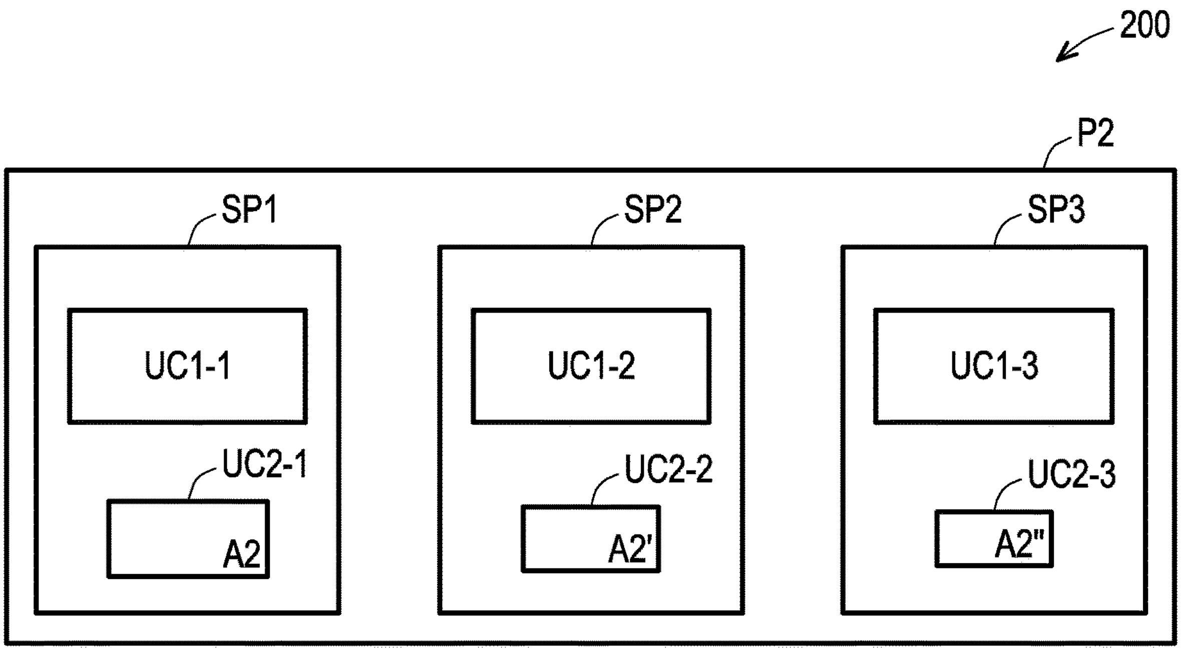
FIG. 8 is a schematic diagram of a micro light emitting diode display panel according to another embodiment of the disclosure.

Referring to FIG. 8, FIG. 8 is a schematic diagram of a micro light emitting diode display panel according to another embodiment of the disclosure. According to this embodiment, a micro light emitting diode display panel 200 includes at least a pixel structure P2. The pixel structure P2 includes sub-pixels SP1, SP2, and SP3. According to this embodiment, the light-emitting colors of the sub-pixels SP1, SP2, and SP3 are different from each other, such as red light, green light, and blue light, but not limited thereto.

According to this embodiment, the structures of the sub-pixels SP1, SP2, and SP3 are approximately similar to the sub-pixel SP1 shown in FIG. 1. Thus, the sub-pixels SP1, SP2, and SP3 may be operated to emit light in multiple luminance intervals respectively. The first luminance interval or the second luminance interval of any two of the sub-pixels SP1, SP2, and SP3 may be partially non-overlapping. For example, the gray-scale value ranges corresponding to the first luminance interval IR1 and the second luminance interval IR2 of the sub-pixel SP1 are 101 to 255 and 0 to 100 respectively, and the gray-scale value ranges corresponding to the first luminance interval IR1 and the second luminance interval IR2 of the sub-pixel SP2 are 131 to 255 and 0 to 130 respectively, but not limited thereto. In other words, although a first micro-light-emitting chip UC1-1, a second micro-light-emitting chip UC2-1 of the sub-pixel SP1 and a first micro-light-emitting chip UC1-2, a second micro-light-emitting chip UC2-2 of the sub-pixel SP2 each emit light according to the settings of the two gray-scale value ranges, they may correspond to different gray-scale value ranges. Similarly, the sub-pixel SP3 may emit light corresponding to the gray-scale value range of the first luminance interval and the second luminance interval with a first micro-light-emitting chip UC1-3 and a second micro-light-emitting chip UC2-3 respectively, and the gray-scale value ranges here may also be different from the sub-pixels SP1 and SP2.

Referring to FIG. 2 and FIG. 8 at the same time, according to this embodiment, it is assumed that the first micro-light-emitting chips UC1-1, UC1-2, and UC1-3 emit light with uneven luminance due to low operating currents under the demand of very low gray-scale value. In this case, the second micro-light-emitting chips UC2-1, UC2-2, and UC2-3 are activated respectively in response to the demand of the gray-scale value. It should be noted that the curve CV2 of the second micro-light-emitting chips UC2-1, UC2-2, and UC2-3 will be different due to the differences in material properties, manufacturing process, and human eye perception of the sub-pixels SP1, SP2, and SP3 in different colors of light. The curves CV2 of all of the sub pixels are not plotted separately for the convenience of illustration. For the reasons mentioned here, light-emitting areas A2, A2', and A2" of the second micro-light-emitting chips UC2-1, UC2-2, and UC2-3 are also adjusted based on curves CV2 that are not exactly the same, and are operated under the respective operating current intervals CR2. Here, any two of the light-emitting areas A2, A2', and A2" of the second micro-light-emitting chip of the sub-pixels SP1, SP2, and SP3 may be different from each other. For example, the light-emitting area A2" is adjusted to be smaller than the light-emitting area A2'; the light-emitting area A2' is adjusted to be smaller than the light-emitting area A2.

To sum up, the micro light emitting diode display panel of the disclosure includes a pixel structure. Each of the sub-pixels of the pixel structure includes a first micro-light-emitting chip and a second micro-light-emitting chip. A first light-emitting area of the first micro-light-emitting chip is larger than a second light-emitting area of the second micro-light-emitting chip. Compared with the first micro-light-emitting chip, the second micro-light-emitting chip has a smaller slope of the tangent line to luminance versus current curve. In this way, based on the gray-scale value or luminance value to be displayed, the sub-pixels of the micro light emitting diode display panel may use the first micro-light-emitting chip and the second micro-light-emitting chip to provide light in different luminance intervals, thus improving the luminescence uniformity of the micro light emitting diode display panel.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A micro light emitting diode display panel comprising:

a plurality of pixel structures, each of the pixel structures comprising at least one sub-pixel, and the at least one sub-pixel is configured to emit light in a plurality of luminance intervals, wherein each of the at least one sub-pixel comprises:

a first micro-light-emitting chip, having a first light-emitting area, and configured to emit light corresponding to a first luminance interval according to a first operating current interval; and a second micro-light-emitting chip, having a second light-emitting area smaller than the first light-emitting area, and configured to emit light corresponding to a second luminance interval according to a second operating current interval, wherein a gray-scale value of the second luminance interval is lower than a gray-scale value of the first luminance interval;

wherein the first micro-light-emitting chip and the second micro-light-emitting chip have the same light-emitting color;

wherein when emitting light, the second micro-light-emitting chip has a smaller slope of a tangent line to a luminance versus current curve than the first micro-light-emitting chip; and wherein the first micro-light-emitting chip has a first operating current density when emitting light, the second micro-light-emitting chip has a second operating current density when emitting light, and the second operating current density is smaller than the first operating current density.

2. The micro light emitting diode display panel according to claim 1, wherein external quantum efficiency of the second micro-light-emitting chip when emitting light is lower than external quantum efficiency of the first micro-light-emitting chip when emitting light.

3. The micro light emitting diode display panel according to claim 1, wherein:

an operating current of the first micro-light-emitting chip in the first operating current interval is linearly proportional to the luminance; and an operating current of the second micro-light-emitting chip in the second operating current interval is linearly proportional to the luminance.

4. The micro light emitting diode display panel according to claim 1, wherein current values of the first operating current interval partially overlap the second operating current interval.

5. The micro light emitting diode display panel according to claim 4, wherein:

the current value of the first operating current interval is greater than or equal to a first current threshold;

the current value of the second operating current interval is greater than or equal to a second current threshold value; and the first current threshold is greater than the second current threshold.

6. The micro light emitting diode display panel according to claim 1, wherein the second light-emitting area is less than or equal to 70% of the first light-emitting area.

7. The micro light emitting diode display panel according to claim 1, wherein each of the at least one sub-pixel further comprises:

a third micro-light-emitting chip, having a third light-emitting area, the third light-emitting area being different from the first light-emitting area and the second light-emitting area, or the third light-emitting area being the same as one of the first light-emitting area and the second light-emitting area.

8. The micro light emitting diode display panel according to claim 7, wherein an operating current of the third micro-light-emitting chip of the at least one sub-pixel in the first luminance interval is different from an operating current thereof in the second luminance interval.

9. The micro light emitting diode display panel according to claim 1, wherein each of the pixel structures comprises a plurality of sub-pixels, wherein light-emitting colors of the sub-pixels are different from each other.

10. The micro light emitting diode display panel according to claim 9, wherein two of the first luminance intervals or two of the second luminance intervals between any two of the sub-pixels are at least partially non-overlapping.

11. The micro light emitting diode display panel according to claim 9, wherein two of the second light-emitting areas between two of the second micro-light-emitting chips of any two of the sub-pixels are different.

* * * * *